United States Patent [19]

Fredericks

[11] 4,055,966
[45] Nov. 1, 1977

[54] TORQUE TRANSMISSION COUPLING

[75] Inventor: Walter A. Fredericks, Warren, Pa.

[73] Assignee: Rexnord, Inc., Milwaukee, Wis.

[21] Appl. No.: 621,450

[22] Filed: Oct. 10, 1975

[51] Int. Cl.² ............................................. F16D 3/78
[52] U.S. Cl. .......................................... 64/13; 64/12; 64/19
[58] Field of Search .................. 64/12, 19, 11, 13, 10

[56] References Cited
U.S. PATENT DOCUMENTS

| | | | |
|---|---|---|---|
| 2,639,595 | 5/1953 | Werner | 64/13 |
| 2,712,741 | 7/1955 | Roller | 64/13 |
| 3,494,147 | 2/1970 | Goody | 64/12 |
| 3,500,658 | 3/1970 | Goody | 64/13 |

Primary Examiner—Samuel Scott
Assistant Examiner—Randall Heald
Attorney, Agent, or Firm—Sughrue, Rothwell, Mion, Zinn and Macpeak

[57] ABSTRACT

The specification discloses six embodiments of a torque transmission coupling employing one or more pilot rings each of which has at least one precision-finished radially symmetric surface to align one or more laminar flexing elements in or on one or more complementary precision-finished radially symmetric surfaces on one or more hubs integral with or adapted to be connected to shafts for the transmission of rotary power. The preferred embodiment comprises a relatively inflexible torque transmission member, a laminar flexing element aligned with the torque transmission member at either end thereof via a pilot ring, and a hub aligned with each of the laminar flexing elements via a further pilot ring on the opposite side of the flexing elements from the first pilot ring, but embodiments are disclosed dispensing with the torque transmission member and with one of the pilot rings on each laminar flexing element.

46 Claims, 12 Drawing Figures

TORQUE TRANSMISSION COUPLING

FIELD OF THE INVENTION

This invention relates to torque transmission couplings such as are used to transmit rotary power from a motor to a machine using the rotary power and to compensate for misalignment between the motor and the machine.

SUMMARY OF THE INVENTION

The torque transmission couplings claimed herein employ one or more pilot rings each of which has at least one precision-finished radially symmetric surface to align one or more laminar flexing elements in or on one or more complementary precision-finished cylindrical surfaces on one or more hubs integral with or adapted to be connected to shafts for the transmission of rotary power.

DESCRIPTION OF THE PRIOR ART

Figures 1, 2, 3:
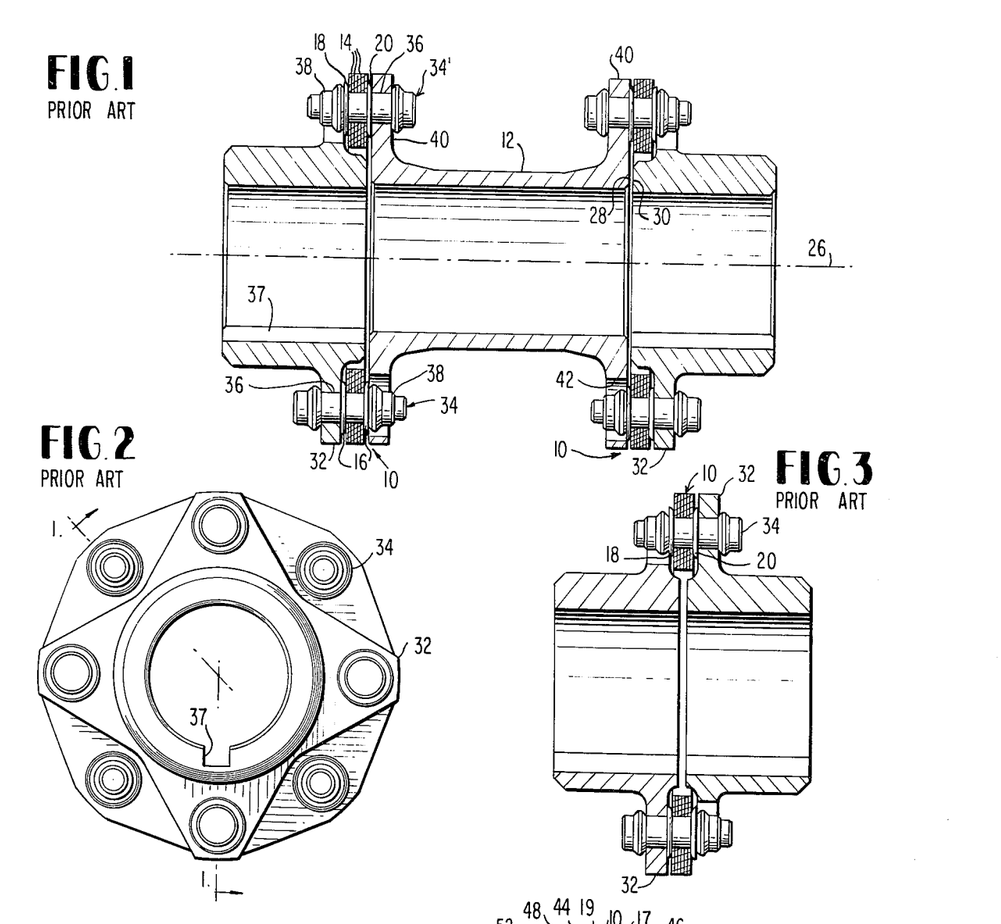
FIG. 1 is a view along lines 1—1 in FIG. 2, showing a prior-art double-flexing coupling employing a torque transmission member.
FIG. 2 is an end view of the double-flexing coupling shown in FIG. 1.
FIG. 3 is a view corresponding to FIG. 1 of a prior art single-flexing coupling.
Figure 10:
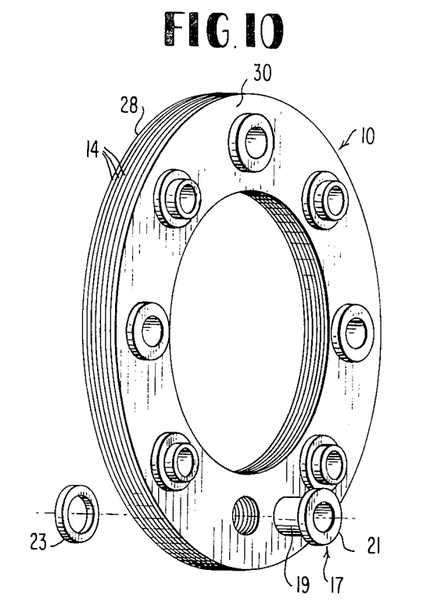
FIG. 10 is a partially exploded perspective view of a laminar flexing element such as is employed in all five of the foregoing embodiments and of fastening means such as are employed in the first two embodiments.

The prior art torque transmission coupling shown in FIGS. 1 and 2 comprises two coupling flexing elements 10 (better seen in FIG. 10) mounted at either end of a relatively inflexible torque transmission member 12. Each flexing element 10 is made up of a plurality of identical flexible laminar elements 14 held together in facing relationship by means 16 which, in the embodiments now manufactured by the assignee of this application, comprise two oppositely beveled stand-off washers 18 and 20 loose fit on a fastening member 34, described hereinafter. The flexing elements need not be cylindrical, as shown in FIG. 10, though they usually are for couplings designed for use at high rotational speeds. In any event, the flexing elements define a coupling axis 26 and two axial faces 28 and 30, the coupling axis 26 being at least approximately coincident with the torque transmission axis of the torque transmission member 12 when the coupling is assembled.

The torque transmission coupling shown in FIGS. 1 and 2 further comprises two hubs 32 adapted to be connected to a shaft for the transmission of rotary power. The hubs 32 are keyed at 37 or otherwise fitted for connection to a rotary shaft; alternatively (though the alternative is rare in practice), the hubs 32 could be integral with the shafts—that is, they could be part of the coupled apparatus rather than part of the coupling apparatus. Instead of the flanged hubs shown, plate- or spool-type adapters may be used, and the word "hub" is used throughout this application to include such adapters as well as equivalents thereof.

The torque transmission coupling shown in FIGS. 1 and 2 further comprises means 34 for mounting the flexing elements 10 on the hubs 32. The means 34 comprise bolts 36 which pass through the hubs 32, the stand-off washers 18 and 20, and the flexing element 10 and nuts 38 which are threaded or press fit on the bolts 36 in abutting relationship with the stand-off washers 18 and 20. Symmetrically mounted between each adjacent pair of the means 34 are identical means 34' which serve to mount the flexing elements 10 on hubs 40 located at either end of the torque transmission member 12. In order to give access to the means 34 and 34' during assembly, the hubs 32 are made in the star shape best seen in FIG. 2, or clearance holes 42 are provided in the hubs 40.

The prior art torque transmission coupling shown in FIG. 3 comprises a single coupling flexing element 10 mounted directly between hubs 32 corresponding to the two spaced hubs 32 in FIGS. 1 and 2 by means 34 corresponding to the means 34 of those figures. Stand-off washers 18 are used to separate the hubs 32 and flexing element 10, as well as the nuts 38 and flexing elements 10. Access to the means 34 during assembly can be provided either by designing both hubs in the star shape shown in FIG. 2 or by providing clearance holes such as clearance holes 42, but the former technique is preferred in order to minimize the weight of the assembly.

The prior art torque transmission couplings shown in FIGS. 1-3 have three significant disadvantages which are overcome by the present invention.

First, the fastening members 34 and 34' must be placed with extreme accuracy, and the clearance between the fastening members 34, 34' and the holes in the hubs 32, 40 and the flexing element 10 through which they pass must be extremely small—on the order of 0.0005 inch for couplings designed for high-speed use. To obtain the necessary fit, extremely accurately manufactured bolts and nuts, called "body fitted bolts" or "aircraft quality bolts", are used—at a cost of approximately $100 apiece for 1-inch diameter 6-inch long bolts and about $35 for the mating nuts. Moreover, the closeness of the fit between the bolts and the holes through which they pass adds immensely to assembly and disassembly time, since the hubs have to be positioned so accurately with respect to each other that the bolts can be eased through by finger pressure in order to avoid gouging the holes and destroying the accuracy of the fit.

As typical for all flexible couplings, if the bolts are not returned to the same holes during reassembly after maintenance and if the reassembled coupling is not thereafter dynamically balanced (which is typically the case in the field), the minute differences between the various bolts can result in dynamic unbalance which can distress or even cause failure of the connected equipment.

Third, the star shape of the hubs 32 causes them to act as inefficient fans during rotation of the coupling, creating air vortices and generating so much noise that sound absorbers may be required around the coupling if workers are to be stationed in its vicinity.

DETAILED DESCRIPTION OF THE PREFERRED EMBODIMENT

Figure 4:
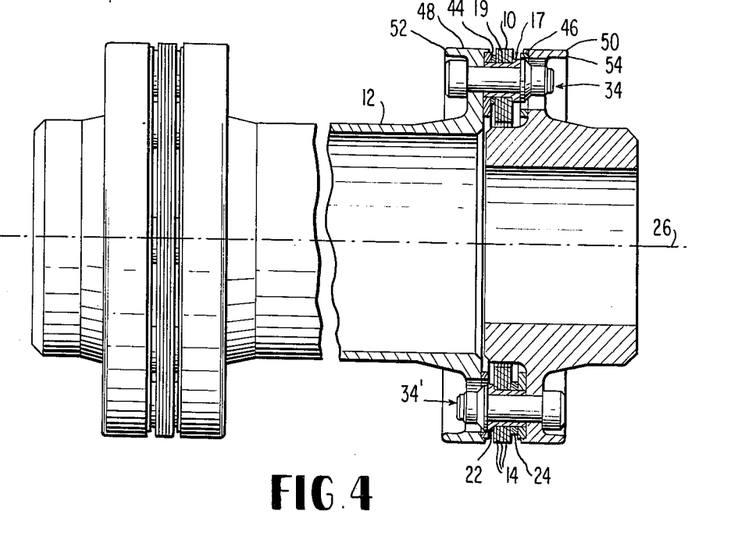
FIG. 4 is a part-sectional, part side view of the preferred embodiment of the present invention.
Figure 4A:
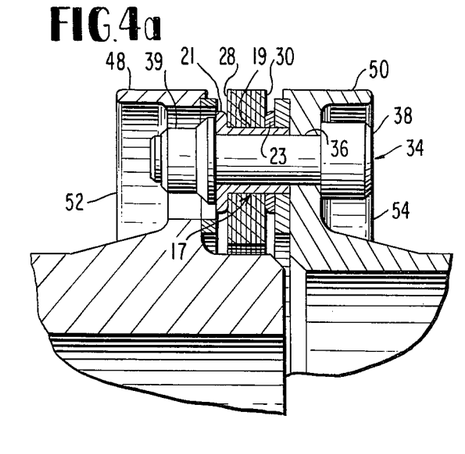
FIG. 4a is an enlarged fragmentary view of a portion of FIG. 4.

The presently preferred embodiment of the subject invention, which is shown in FIGS. 4 and 4a, employs many of the same parts as the prior-art coupling shown in FIGS. 1 and 2. Accordingly, the same numbers have been used on FIGS. 4 and 4a where appropriate, and the description of those parts will not be repeated.

While they are not a part of this invention per se, the flexible laminar elements 14 are advantageously held together in facing relationship by means 17 of the type disclosed in commonly assigned, now abandoned U.S. patent application Ser. No. 328,842, filed Feb. 1, 1973 now abandoned. These means (more clearly seen in FIG. 10) comprise an axially hollow fastening member 19 having an integrally mounted nut 21 at one end and a press fit flange 23 at the other. As disclosed in the above-mentioned patent application, the laminar elements 14 are preferably pre-stressed together by means of the force exerted on the opposite faces 28 and 30 of the flexing element 10 by the flanges 21 and 23.

Figure 9:
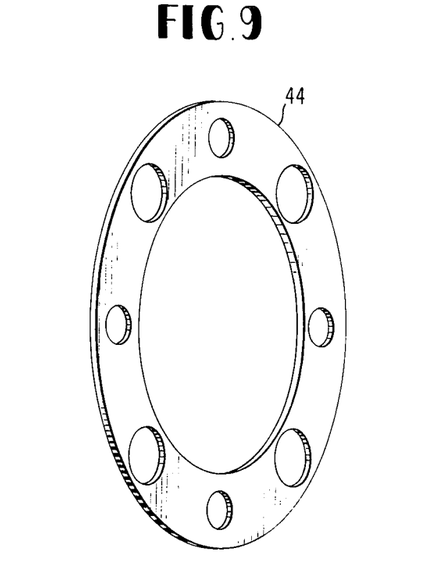
FIG. 9 is a perspective view of a pilot ring such as is employed in all five of the foregoing embodiments.

In addition to the parts previously described herein and in the above mentioned application, the coupling shown in FIGS. 4 and 4a comprises two pilot rings 44 and 46 located at each flexing point. One such pilot ring is illustrated in perspective in FIG. 9. These pilot rings have radially outward precision-finished radially symmetric surfaces which serve as part of the alignment means for the coupling. The radially symmetric surfaces may be cylindrical or conical, the latter shape facilitating assembly and disassembly but being more expensive to produce. During manufacturing, the pilot rings are press fit in an unfinished state onto the fastening members 17, and then the radially outward surface of the rings are precision machined about the coupling axis.

The balance of the alignment means for the couplings are radially inward precision-finished radially symmetric surfaces on the flanges 48 of the torque transmission member 12 and on the hubs 50. The precision-finished surfaces on the hubs are dimensioned to complement the corresponding precision-finished surfaces on the adjacent pilot ring, and they are machined into the flanges so that their axes are coincident with the coupling axis.

Cylindrical shrouds 52 and 54 are mounted on or integral with the flanges 48 and 50, respectively, on the sides thereof remote from the coupling flexing element 10. The axis of the cylindrical shrouds 52 and 54 are coincident with the coupling axis 26, and the inner faces of the shrouds are radially outward from the fastening means 34, 34'. The shrouds constitute a smooth circumferential surface which prevents the kind of fan-effect which has been a drawback in the prior art.

The means 34, 34' are, as with the prior art, alternately mounted on adjacent hubs, and holes are provided in each hub to provide access to the fastening members not mounted on that hub.

ADVANTAGES OF THE INVENTION

The coupling shown in FIGS. 4 and 4a, as well as the alternative embodiments discussed hereinafter, have a number of important advantages in comparison to the prior art.

First, precision finishing of radially symmetric surfaces is relatively simple and inexpensive, and the mating surfaces of the pilot rings and the hubs can be readily machined to a nominal clearance of 0.001 inch for a 4-inch diameter coupling. That nominal clearance in fact provides a certain amount of interference fit due to microscopic eccentricities in the two supposedly radially symmetric surfaces, and it provides excellent alignment for the coupling. Not only is the undersirable clearance (i.e., the tolerances which permit radial movement of the parts) in the prior-art couplings eliminated with this invention, but the fact that a much larger circumferential surface is in contact between the flanges and the flexing elements minimizes gouging of the mating surfaces during assembly and disassembly and minimize the effect of the gouging when it does happen because the portion of the surface gouged during any single assembly or disassembly is a small fraction of the total mating surface.

Second, the fact that relatively large circumferential precision-finished surfaces are in contact also minimizes the problems of dynamic unbalance due to reassembly—that is, a reassembled coupling is substantially less likely to be significantly out of balance than is the case with the prior-art couplings.

Third, the design of the coupling inherently shifts the half coupling's center of gravity back towards the axially outer ends of the coupling—from 0.625 inches back from the front face of the hub on a typical 6.719 inch diameter coupling of the type shown in FIGS. 1 and 2 to 0.737 inches back from the front face of the hub on a coupling of the same size of the type shown in FIGS. 4 and 4a. Since the radial load on the bearings of each of the two pieces of machinery to which the coupling is connected is approximately equal to half the weight of the coupling times the distance from the outer bearing to the half coupling's center of gravity, moving the half coupling's center of gravity in that direction even a fraction of an inch can be more important in reducing the radial load on the bearings than reducing the weight of the coupling by many pounds for a typical installation. It should be noted that the larger the coupling is the more the center of gravity shifts back relative to the equivalently sized prior-art couplings.

Fourth, the round flanged hubs can be significantly lighter than the star-shaped hubs used in the prior art because the lugs, or rays of the stars, on those hubs have to be thicker to prevent flexing of the lugs than the radially symmetric hubs used with the present invention.

Fifth, since the fastening means 34, 34' no longer perform an aligning function, they can be ordinary commercial-grade nuts and bolts costing on the order of $2–$3 apiece, or approximately one-fiftieth to one-hundredth of the cost of the nuts and bolts used in the prior art couplings.

Sixth, the holes through which the bolts are mounted need not be positioned or sized with extreme accuracy since, if the bolts are somewhat loose or if an excessively high shock load occurs, any slippage will be circumferential and will not affect the radial relationship of the coupling components.

DESCRIPTIONS OF ALTERNATIVE EMBODIMENTS

While the alternative embodiments shown in FIGS. 5, 6, 7, 8, and 11 are not currently preferred to the embodiment shown in FIGS. 4 and 4a, they are all believed to be commercially feasible designs, and brief descriptions of them are included here to illustrate the scope of the subject invention.

Figure 5:
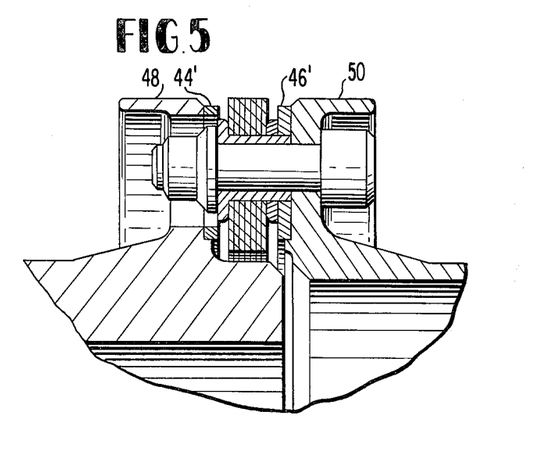
FIG. 5 is a fragmentary view corresponding to FIG. 4a of a second embodiment of the present invention.

The FIG. 5 embodiment corresponds to the FIG. 4a embodiment except that the radially symmetric surfaces are provided on the inside of the pilot rings 44', 46' and the corresponding surfaces on the hubs 48, 50 are convex rather than concave, as in the FIG. 4a embodiment.

Figure 6:
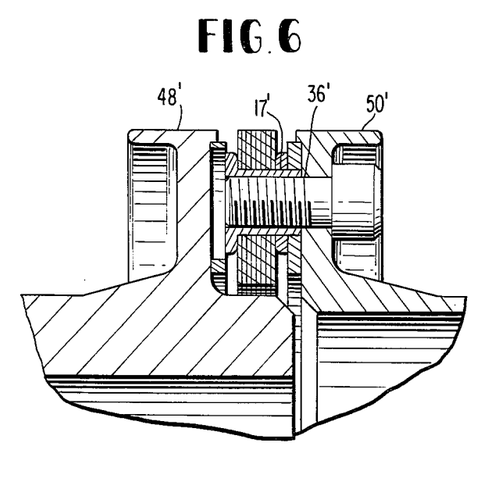
FIG. 6 is a fragmentary view corresponding to FIG. 4a of a third embodiment of the present invention.

The FIG. 6 embodiment is the same as the FIG. 4a embodiment except that the fastening members 36' are threaded into the fastening members 17', thereby avoiding the need for corresponding access holes in the hubs 48', 50'.

Figure 7:
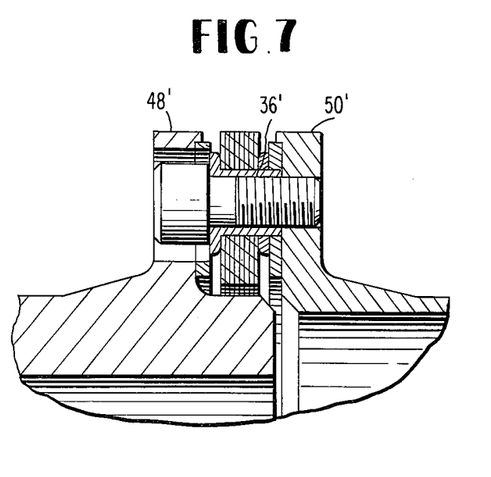
FIG. 7 is a fragmentary view corresponding to FIG. 4a of a fourth embodiment of the present invention.

The FIG. 7 embodiment corresponds to the FIG. 6 embodiment except that the fastening members 36' are threaded into the hubs 48', 50', thereby eliminating the need for a mating nut.

Figure 8:
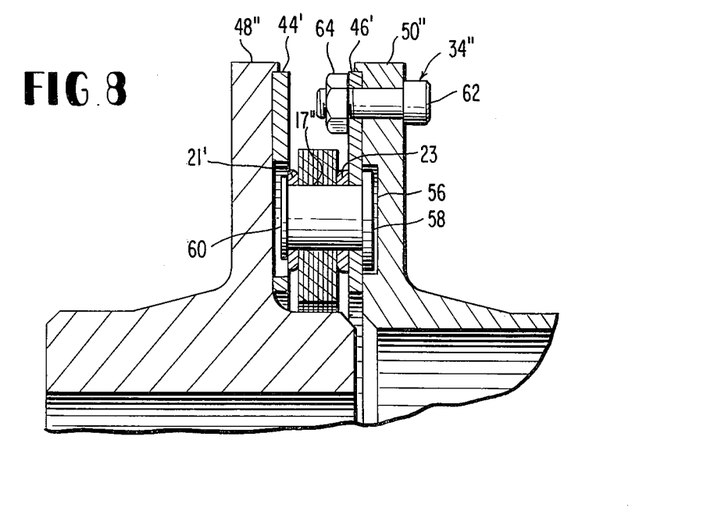
FIG. 8 is a fragmentary view corresponding to FIG. 4a of a fifth embodiment of the present invention.

The FIG. 8 embodiment differs a little more from the FIG. 4a embodiment than do the FIGS. 5-7 embodiments. In this embodiment, the fastening members 17" are solid rivets onto which the washers 21' and 23 and the pilot rings 44', 46' are press fit. A shallow blind bore 56 is provided in the hub 50" to accommodate the head 58 of the illustrated rivet and a clearance hole 60 is provided in the pilot ring 44' to accommodate the flange of the rivet. Then, since the rivets are not hollow, separate means 34" comprising a bolt 62 and a nut 64 are provided for attaching the pilot rings 44', 46' to the hubs 48", 50".

Figure 11:
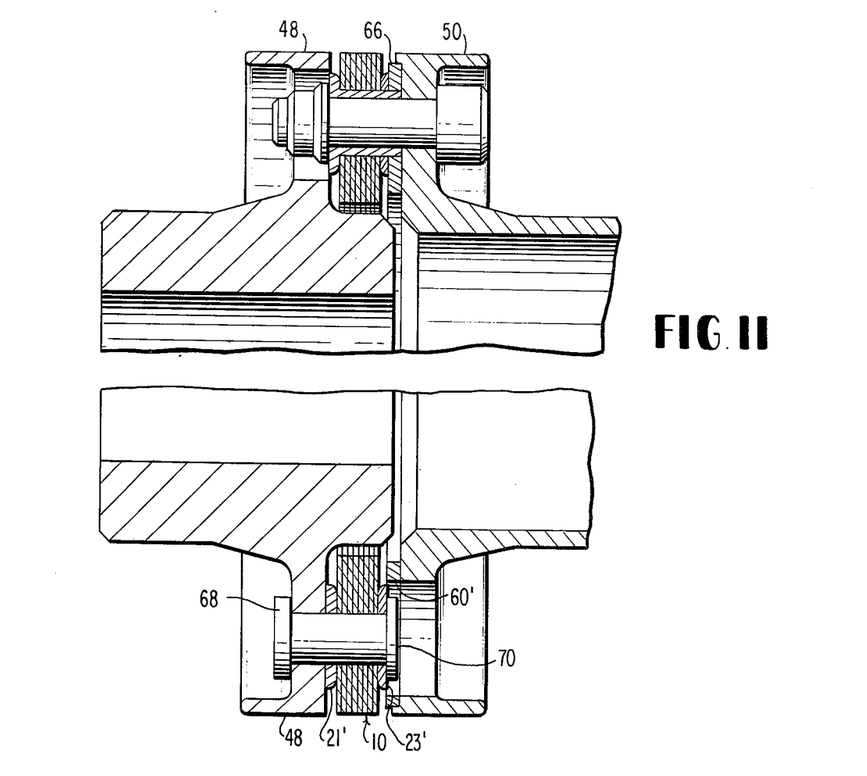
FIG. 11 is a view corresponding to the right-hand side of FIG. 4 of a sixth embodiment of the present invention, which embodiment uses only a single pilot ring.

The FIG. 11 embodiment differs still more from the FIG. 4a embodiment, for in this embodiment only a single pilot ring 66 is used. The flexing element 10 is mounted directly on the hub 48 via fastening means 68 onto which the flexing element 10 and the flanges 21' are 23' are press fit. Although not strictly necessary, a flange 70 is preferably provided at the tail of the fastening means 68 to aid in the retention of the flexing element 10 and the flange 21' and 23'. If the flange 70 is provided, then a clearance hole 60' is provided in the pilot ring 66 to accommodate it. Finally, the pilot ring 66 is connected to the flexing element 10 and the hub 50 by another fastening member 68 which passes through the hub 50 and the flexing element 10. The advantages of this construction are that it reduces the number of interfaces between parts and thus the accumulation of tolerances and that it reduces the weight of the coupling by the weight of the omitted pilot ring. The disadvantages are that it provides relatively less flexibility than the two pilot ring versions and it requires more accuracy in the size and positioning of the bolts.

CAVEAT

While the present invention has been illustrated by detailed descriptions of several preferred embodiments thereof, it will be obvious to those skilled in the art that various changes in form and detail can be made therein without departing from the true scope of the invention. For that reason, the invention must be measured by the claims appended hereto and not by the foregoing preferred embodiments.

What is claimed is:

1. A coupling for transmitting rotary power, said coupling comprising:
   a. a plurality of flexible laminar elements;
   b. first means for holding said laminar elements in facing relationship, thereby creating a coupling flexing element having a coupling axis and two axial faces;
   c. a first pilot ring alignment means having at least one precision-finished radially symmetric surface for aligning said coupling flexing element with a first hub;
   d. second means for affixing said first pilot ring to a first axial face of said coupling flexing element such that the axis of the precision-finished radially symmetric surface is coincident with the coupling axis;
   e. said first hub being integral with or adapted to be connected to a shaft for the transmission of rotary power and having at least one precision-finished radially symmetric surface that axis of which is at least approximately coincident with the coupling axis and which is dimensioned to complement precision-finished radially symmetric surface on said first pilot ring; and
   f. third means for mounting said coupling flexing element on said first hub.

2. A coupling as recited in claim 1 wherein said first means comprise:
   a. a plurality of holes passing through said coupling flexing element in the direction of its coupling axis;
   b. a plurality of first fastening members each of which is sized to fit tightly inside one of said plurality of holes in said coupling flexing element and to pass through said coupling flexing element;
   c. a plurality of first nuts one of which is mounted on or integral with each of said plurality of first fastening members and in abutting relationship with the first axial face of said coupling flexing element; and
   d. a plurality of second nuts one of which is mounted on or integral with each of said plurality of first fastening members and in abutting relationship with the second axial face of said coupling flexing element.

3. A coupling as recited in claim 2 wherein said second means comprises:
   a. a plurality of holes passing through said first pilot ring in the direction of its axis and in locations corresponding to the locations of said holes in said coupling flexing element and
   b. a press fit between said first fastening members and said holes in said first pilot ring.

4. A coupling as recited in claim 3 wherein
   a. said first fastening members are axially hollow and
   b. said third means comprises:
      i. a plurality of holes passing through said first hub in the direction of its axis and in locations corresponding to the locations of holes in said coupling flexing element;
      ii. a plurality of second fastening members each of which is sized to fit tightly inside the axial hollow in one of said first fastening members and to pass through said first fastening member and said first hub;
      iii. a plurality of third nuts one of which is mounted on or integral with each of said plurality of second fastening members and in abutting relationship with the surface of said first hub on the side thereof opposite to said coupling flexing element; and iv. a plurality of fourth nuts one of which is mounted on or integral with each of said plurality of second fastening members and in abutting relationship with the one of said first and second nuts furthest removed from said first hub on the side of said nut furthest removed from said first hub.

5. A coupling as recited in claim 1 and further comprising a cylindrical shroud mounted on or integral with said first hub on the side thereof remote from said coupling flexing element, the axis of said cylindrical shroud being at least approximately coincident with the coupling axis and the inner face of said cylindrical shroud being radially outside said third means.

6. A coupling as recited in claim 1 and further comprising:
   a. a second pilot ring alignment means having at least one precision-finished radially symmetric surface for aligning said coupling flexing element with a second hub;
   b. fourth means for affixing said second pilot ring to the second axial face of said coupling flexing element such that the axis of the precision-finished radially symmetric surface is coincident with the coupling axis;
   c. said second hub being integral with or adapted to be connected to a shaft for the transmission of rotary power and having at least one precision-finished radially symmetric surface the axis of which is at least approximately coincident with the coupling axis and which is dimensioned to complement the precision-finished radially symmetric surface on said second pilot ring; and
   d. fifth means for mounting said coupling flexing element on said second hub.

7. A coupling as recited in claim 6 wherein said first means comprise:
   a. a plurality of holes passing through said coupling flexing element in the direction of its coupling axis;
   b. a plurality of first fastening members each of which is sized to fit tightly inside one of said plurality of holes in said coupling flexing element and to pass through said coupling flexing element;
   c. a plurality of first nuts one of which is mounted on or integral with each of said plurality of first fastening members and in abutting relationship with the first axial face of said coupling flexing element; and
   d. a plurality of second nuts one of which is mounted on or integral with each of said plurality of first fastening members and in abutting relationship with the second axial face of said coupling flexing element.

8. A coupling as recited in claim 7 wherein said second and fourth means comprise:
   a. a plurality of holes passing through said first and second pilot rings in the direction of their axes and in locations corresponding to the locations of said holes in said coupling flexing element and
   b. a press fit between said first fastening members and said holes in said first and second pilot rings.

9. A coupling as recited in claim 8 wherein
   a. said first fastening members are axially hollow and
   b. said third and fifth means comprise:
      i. a plurality of holes passing through at least one of said first and second hubs in the direction of their axes and in locations corresponding to the locations of holes in said coupling flexing element;
      ii. a plurality of second fastening members each of which is sized to fit tightly inside the axial hollow in one of said first fastening members and to pass through said first fastening member and said at least one of said first and second hubs;
      iii. a plurality of third nuts one of which is mounted on or integral with each of said plurality of second fastening members and in abutting relationship with the surface of said at least one of said first and second hubs on the side thereof opposite to said coupling flexing element, and
      iv. a plurality of fourth nuts one of which is mounted on or integral with each of said plurality of second fastening members and in abutting relationship with the one of said first and second nuts furthest removed from said first hub on the side of said nut furthest removed from said first hub.

10. A coupling as recited in claim 6 and further comprising a cylindrical shroud mounted on or integral with said first and second hubs on the side thereof remote from said coupling flexing element, the axis of said cylindrical shroud being at least approximately coincident with the coupling axis and the inner face of said cylindrical shroud being radially outside said third means.

11. A coupling as recited in claim 6 and further comprising a relatively inflexible torque transmission member having a torque transmission axis which is at least approximately coincident with the coupling axis, said second hub being mounted on or integral with said torque transmission member.

12. A coupling as recited in claim 11 wherein said first means comprises:
   a. a plurality of holes passing through said coupling flexing element in the direction of its coupling axis;
   b. a plurality of first fastening members each of which is sized to fit tightly inside one of said plurality of holes in said coupling flexing element and to pass through said coupling flexing element;
   c. a plurality of first nuts one of which is mounted on or integral with each of said plurality of first fastening members and in abutting relationship with the first axial face of said coupling flexing element; and
   d. a plurality of second nuts one of which is mounted on or integral with each of said plurality of first fastening members and in abutting relationship with the second axial face of said coupling flexing element.

13. A coupling as recited in claim 12 wherein said second and fourth means comprise:
   a. a plurality of holes passing through said first and second pilot rings in the direction of their axes and in locations corresponding to the locations of said holes in said coupling flexing element and
   b. a press fit between said first fastening members and said holes in said first and second pilot rings.

14. A coupling as recited in claim 13 wherein
   a. said first fastening members are axially hollow and
   b. said third and fifth means comprise:
      i. a plurality of holes passing through at least one of said first and second hubs in the direction of their axes and in locations corresponding to the locations of holes in said coupling flexing element;
      ii. a plurality of second fastening members each of which is sized to fit lightly inside the axial hollow in one of said first fastening members and to pass through said first fastening member and said at least one of said first and second hubs;
      iii. a plurality of third nuts one of which is mounted on or integral with each of said plurality of second fastening members and in abutting relationship with the surface of said at least one of said first and second hubs on the side thereof opposite to said coupling flexing element, and iv. a plurality of fourth nuts one of which is mounted on or integral with each of said plurality of second fastening members and in abutting relationship with the one of said first and second nuts furthest removed from said first hub on the side of said nut furthest removed from said first hub.

15. A coupling as recited in claim 11 and further comprising a cylindrical shroud mounted on or integral with said first and second hubs on the side thereof remote from said coupling flexing element, the axis of said cylindrical shroud being at least approximately coincident with the coupling axis and the inner face of said cylindrical shroud being radially outside said third means.

16. In a coupling for transmitting rotary power, said coupling comprising:
   a. a plurality of flexible laminar elements;
   b. first means for holding said laminar elements in facing relationship, thereby creating a coupling flexing element having a coupling axis and two axial faces;
   c. a first hub integral with or adapted to be connected to a shaft for the transmission of rotary power; and
   d. second means for mounting said coupling flexing element on said first hub, the improvement wherein
   e. said first hub has at least one precision-finished radially symmetric surface the axis of which is at least approximately coincident with the coupling axis and
   f. the coupling further comprises
      i. a first pilot ring alignment means having at least one precision-finished radially symmetric surface dimensioned to complement the precision-finished radially symmetric surface on said first hub for aligning said first hub and said coupling flexing element and
      ii. third means for affixing said first pilot ring to a first axial face of said coupling flexing element such that the axis of the precision-finished radially symmetric surface is coincident with the coupling axis.

17. A coupling as recited in claim 16 wherein said first means comprise:
   a. a plurality of holes passing through said coupling flexing element in the direction of its coupling axis;
   b. a plurality of first fastening members each of which is sized to fit tightly inside one of said plurality of holes in said coupling flexing element and to pass through said coupling flexing element;
   c. a plurality of first nuts one of which is mounted on or integral with each of said plurality of first fastening members and in abutting relationship with the first axial face of said coupling flexing element; and
   d. a plurality of second nuts one of which is mounted on or integral with each of said plurality of first fastening members and in abutting relationship with the second axial face of said coupling flexing element.

18. A coupling as recited in claim 17 wherein said third means comprises:
   a. a plurality of holes passing through said first pilot ring in the direction of its axis and in locations corresponding to the locations of said holes in said coupling flexing element and b. a press fit between said first fastening members and said holes in said first pilot ring.

19. A coupling as recited in claim 18 wherein
   a. said first fastening members are axially hollow and
   b. said second means comprises:
      i. a plurality of holes passing through said first hub in the direction of its axis and in locations corresponding to the locations of holes in said coupling flexing element;
      ii. a plurality of second fastening members each of which is sized to fit tightly inside the axial hollow in one of said first fastening members and to pass through said first fastening member and said first hub;
      iii. a plurality of third nuts one of which is mounted on or integral with each of said plurality of second fastening members and in abutting relationship with the surface of said first hub on the side thereof opposite to said coupling flexing element; and
      iv. a plurality of fourth nuts one of which is mounted on or integral with each of said plurality of second fastening members and in abutting relationship with the one of said first and second nuts furthest removed from said first hub on the side of said nut furthest removed from said first hub.

20. A coupling as recited in claim 16 and further comprising a cylindrical shroud mounted on or integral with said first hub on the side thereof remote from said coupling flexing element, the axis of said cylindrical shroud being at least approximately coincident with the coupling axis and the inner face of said cylindrical shroud being radially outside said second means.

21. A coupling as recited in claim 16 and further comprising:
   a. a second pilot ring alignment means having at least one precision-finished radially symmetric surface for aligning said coupling flexing element with a second hub;
   b. fourth means for affixing said second pilot ring to the second axial face of said coupling flexing element such that the axis of the precision-finished radially symmetric surface is coincident with the coupling axis;
   c. said second hub being integral with or adapted to be connected to a shaft for the transmission of rotary power and having at least one precision-finished radially symmetric surface the axis of which is at least approximately coincident with the coupling axis and which is dimensioned to complement the precision-finished radially symmetric surface on said second pilot ring; and
   d. fifth means for mounting said coupling flexing element on said second hub.

22. A coupling as recited in claim 21 wherein said first means comprise:
   a. a plurality of holes passing through said coupling flexing element in the direction of its coupling axis;
   b. a plurality of first fastening members each of which is sized to fit tightly inside one of said plurality of holes in said coupling flexing element and to pass through said coupling flexing element;
   c. a plurality of first nuts one of which is mounted on or integral with each of said plurality of first fastening members and in abutting relationship with the first axial face of said coupling flexing element; and
   d. a plurality of second nuts one of which is mounted on or integral with each of said plurality of first fastening members and in abutting relationship with the second axial face of said coupling flexing element.

23. A coupling as recited in claim 22 wherein said third and fourth means comprise:
   a. a plurality of holes passing through said first and second pilot rings in the direction of their axes and in locations corresponding to the locations of said holes in said coupling flexing element and
   b. a press fit between said first fastening members and said holes in said first and second pilot rings.

24. A coupling as recited in claim 23 wherein
   a. said first fastening members are axially hollow and
   b. said second and fifth means comprise:
      i. a plurality of holes passing through at least one of said first and second hubs in the direction of their axes and in locations corresponding to the locations of holes in said coupling flexing element;
      ii. a plurality of second fastening members each of which is sized to fit tightly inside the axial hollow in one of said first fastening members and to pass through said first fastening member and said at least one of said first and second hubs;
      iii. a plurality of third nuts one of which is mounted on or integral with each of said plurality of second fastening members and in abutting relationship with the surface of said at least one of said first and second hubs on the side thereof opposite to said coupling flexing element, and
      iv. a plurality of fourth nuts one of which is mounted on or integral with each of said plurality of second fastening members and in abutting relationship with the one of said first and second nuts furthest removed from said first hub on the side of said nut furthest removed from said first hub.

25. A coupling as recited in claim 16 and further comprising a cylindrical shroud mounted on or integral with said first and second hubs on the side thereof remote from said coupling flexing element, the axis of said cylindrical shroud being at least approximately coincident with the coupling axis and the inner face of said cylindrical shroud being radially outside said second means.

26. A coupling as recited in claim 16 and further comprising a relatively inflexible torque transmission member having a torque transmission axis which is at least approximately coincident with the coupling axis, said second hub being mounted on or integral with said torque transmission members.

27. A coupling as recited in claim 26 wherein said first means comprises:
   a. a plurality of holes passing through said coupling flexing element in the direction of its coupling axis;
   b. a plurality of first fastening members each of which is sized to fit tightly inside one of said plurality of holes in said coupling flexing element and to pass through said coupling flexing element;
   c. a plurality of first nuts one of which is mounted on or integral with each of said plurality of first fastening members and in abutting relationship with the first axial face of said coupling flexing element; and
   d. a plurality of second nuts one of which is mounted on or integral with each of said plurality of first fastening members and in abutting relationship with the second axial face of said coupling flexing element.

28. A coupling as recited in claim 27 wherein said second and fourth means comprise:
   a. a plurality of holes passing through said first and second pilot rings in the direction of their axes and in locations corresponding to the locations of said holes in said coupling flexing element and
   b. a press fit between said first fastening members and said holes in said first and second pilot rings.

29. A coupling as recited in claim 28 wherein
   a. said first fastening members are axially hollow and
   b. said third and fifth means comprise:
      i. a plurality of holes passing through at least one of said first and second hubs in the direction of their axes and in locations corresponding to the locations of holes in said coupling flexing element;
      ii. a plurality of second fastening members each of which is sized to fit tightly inside the axial hollow in one of said first fastening members and to pass through said first fastening member and said at least one of said first and second hubs;
      iii. a plurality of third nuts one of which is mounted on or integral with each of said plurality of second fastening members and in abutting relationship with the surface of said at least one of said first and second hubs on the side thereof opposite to said coupling flexing element; and
      iv. a plurality of fourth nuts one of which is mounted on or integral with each of said plurality of second fastening members and in abutting relationship with the one of said first and second nuts furthest removed from said first hub on the side of said nut furthest removed from said first hub.

30. A coupling as recited in claim 26 and further comprising a cylindrical shroud mounted on or integral with said first and second hubs on the side thereof remote from said coupling flexing element, the axis of said cylindrical shroud being at least approximately coincident with the coupling axis and the inner face of said cylindrical shroud being radially outside said third means.

31. A sub-assembly for a coupling for transmitting rotary power, said sub-assembly comprising:
   a. a plurality of flexible laminar elements;
   b. first means for holding said laminar elements in facing relationship, thereby creating a coupling flexing element having a coupling axis and two axial faces;
   c. a first pilot ring alignment means having at least one precision-finished radially symmetric surface for aligning said coupling flexing element with a first hub; and
   d. second means for affixing said first pilot ring to a first axial face of said coupling flexing element such that the axis of the precision-finished radially symmetric surface is coincident with the coupling axis.

32. A sub-assembly as recited in claim 31 wherein said first means comprises:
   a. a plurality of holes passing through said coupling flexing element in the direction of its coupling axis;
   b. a plurality of first fastening members each of which is sized to fit tightly inside one of said plurality of holes in said coupling flexing element and to pass through said coupling flexing element;
   c. a plurality of first nuts one of which is mounted on or integral with each of said plurality of first fastening members and in abutting relationship with the first axial face of said coupling flexing element; and
   d. a plurality of second nuts one of which is mounted on or integral with each of said plurality of first fastening members and in abutting relationship with the second axial face of said coupling flexing element.

33. A sub-assembly as recited in claim 32 wherein said second means comprises:
 a. a plurality of holes passing through said first pilot ring in the direction of its axis and in locations corresponding to the locations of said holes in said couplig flexing element and
 b. a press fit between said first fastening members and said holes in said first pilot ring.

34. A sub-assembly as recited in claim 33 wherein said first fastening members are axially hollow.

35. A sub-assembly as recited in claim 31 and further comprising:
 a. a second pilot ring alignment means having at least one precision-finished radially symmetric surface for aligning said coupling flexing element with a second hub and
 b. third means for affixing said second pilot ring to the second axial face of said coupling flexing element such that the axis of the precision-finished radially symmetric surface is coincident with the coupling axis.

36. A sub-assembly as recited in claim 35 wherein said first means comprises:
 a. a plurality of holes passing through said coupling flexing element in the direction of its coupling axis;
 b. a plurality of first fastening members each of which is sized to fit tightly inside one of said plurality of holes in said coupling flexing element and to pass through said coupling flexing element;
 c. a plurality of first nuts one of which is mounted on or integral with each of said plurality of first fastening members and in abutting relationship with the first axial face of said coupling element; and
 d. a plurality of second nuts one of which is mounted on or integral with each of said plurality of first fastening members and in abutting relationship with the second axial face of said coupling flexing element.

37. A sub-assembly as recited in claim 36 wherein said second and third means comprise:
 a. a plurality of holes passing through said first pilot ring in the direction of its axis and in locations corresponding to the locations of said holes in said coupling flexing element and
 b. a press fit between said first fastening members and said holes in said first pilot ring.

38. A sub-assembly as recited in claim 37 wherein said first fastening members are axially hollow.

39. In a sub-assembly for a coupling for transmitting rotary power, said sub-assembly comprisings:
 a. a plurality of flexible laminar elements and
 b. first means for holding said laminar elements in facing relationship, thereby creating a coupling flexing element having a coupling axis and two axial faces, the improvement wherein said sub-assembly further comprises:
 c. a first pilot ring alignment means having at least one precision-finished radially symmetric surface for aligning said coupling flexing element with a first hub and
 d. second means for affixing said first pilot ring to a first axial face of said coupling flexing element such that the axis of the precision-finished radially symmetric surface is coincident with the coupling axis.

40. A sub-assembly as recited in claim 39 wherein said first means comprises:
 a. a plurality of holes passing through said coupling flexing element in the direction of its coupling axis.
 b. a plurality of first fastening members each of which is sized to fit tightly inside one of said plurality of holes in said coupling flexing element and to pass through said coupling flexing element;
 c. a plurality of first nuts one of which is mounted on or integral with each of said plurality of first fastening members and in abutting relationship with the first axial face of said coupling flexing element; and
 d. a plurality of second nuts one of which is mounted on or integral with each of said plurality of first fastening members and in abutting relationship with the second axial face of said coupling flexing element.

41. A sub-assembly as recited in claim 40 wherein said second means comprises:
 a. a plurality of holes passing through said first pilot ring in the direction of its axis and in locations corresponding to the locations of said holes in said coupling flexing element and
 b. a press fit between said first fastening members and said holes in said first pilot ring.

42. A sub-assembly as recited in claim 41 wherein said first fastening members are axially hollow.

43. A sub-assembly as recited in claim 39 and further comprising:
 a. a second pilot ring alignment means having at least one precision-finished radially symmetric surface for aligning said coupling flexing element with a second hub and
 b. a third means for affixing said second pilot ring to the second axial face of said coupling flexing element such that the axis of the precision-finished radially symmetric surface is coincident with the coupling axis.

44. A sub-assembly as recited in claim 43 wherein said first means comprises:
 a. a plurality of holes passing through said coupling flexing element in the direction of its coupling axis;
 b. a plurality of first fastening members each of which is sized to fit tightly inside one of said plurality of holes in said coupling flexing element and to pass through said coupling flexing element;
 c. a plurality of first nuts one of which is mounted on or integral with each of said plurality of first fastening members and in abutting relationship with the first axial face of said coupling flexinng element; and
 d. a plurality of second nuts one of which is mounted on or integral with each of said plurality of first fastening members and in abutting relationship with the second axial face of said coupling flexing element.

45. A sub-assembly as recited in claim 44 wherein said second and third means comprise:
 a. a plurality of holes passing through said first pilot ring in the direction of its axis and in locations corresponding to the locations of said holes in said coupling flexing element and
 b. a press fit between said first fastening members and said holes in said first pilot ring.

46. A sub-assembly as recited in claim 45 wherein said first fastening members are axially hollow.

* * * * *

REEXAMINATION CERTIFICATE (312th)

United States Patent [19]

Fredericks

[11] B1 4,055,966

[45] Certificate Issued  Mar. 19, 1985

[54] TORQUE TRANSMISSION COUPLING

[75] Inventor: Walter A. Fredericks, Warren, Pa.

[73] Assignee: Rexnord, Inc., Milwaukee, Wis.

Reexamination Request:
No. 90/000,447, Sep. 19, 1983

Reexamination Certificate for:
| | |
|---|---|
| Patent No.: | 4,055,966 |
| Issued: | Nov. 1, 1977 |
| Appl. No.: | 621,450 |
| Filed: | Oct. 10, 1975 |

[51] Int. Cl.³ .............................................. F16D 3/78
[52] U.S. Cl. ................................................... 464/99
[58] Field of Search ..................... 464/94, 95, 98, 99

[56] References Cited
U.S. PATENT DOCUMENTS

| 1,387,532 | 8/1921 | Dexter | 464/99 |
| 1,454,087 | 5/1923 | Thomas | 464/99 |
| 3,703,817 | 11/1972 | Orwin | 464/99 |

OTHER PUBLICATIONS

One page from Rigiflex German catalog.

Primary Examiner—Daniel P. Stodola

[57]  ABSTRACT

The specification discloses six embodiments of a torque transmission coupling employing one or more pilot rings each of which has at least one precision-finished radially symmetric surface to align one or more laminar flexing elements in or on one or more complementary precision-finished radially symmetric surfaces on one or more hubs integral with or adapted to be connected to shafts for the transmission of rotary power. The preferred embodiment comprises a relatively inflexible torque transmission member, a laminar flexing element aligned with the torque transmission member at either end thereof via a pilot ring, and a hub aligned with each of the laminar flexing elements via a further pilot ring on the opposite side of the flexing elements from the first pilot ring, but embodiments are disclosed dispensing with the torque transmission member and with one of the pilot rings on each laminar flexing element.

B1 4,055,966

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–3, 5–8, 10–34 and 36–46 are cancelled.

Claims 4, 9, and 35 are determined to be patentable as amended.

New claims 47–56 are added and determined to be patentable.

4. A coupling [as recited in claim 3 wherein] *for transmitting rotary power, comprising:*
   a. [said first fastening members are axially hollow and] *a plurality of flexible laminar elements;*
   b. *first means for holding said laminar elements in facing relationship, thereby creating a coupling flexing element having a coupling axis and two axial faces, said first means comprising:*
      i. *a plurality of holes passing through said coupling flexing element in the direction of its coupling axis;*
      ii. *a plurality of first fastening members each of which is axially hollow and sized to fit tightly inside one of said plurality of holes in said coupling flexing element and to pass through said coupling flexing element;*
      iii. *a plurality of first nuts one of which is mounted on or integral with each of said plurality of first fastening members and in abutting relationship with a first axial face of said coupling flexing element; and*
      iv. *a plurality of second nuts one of which is mounted on or integral with each of said plurality of first fastening members and in abutting relationship with the second axial face of said coupling flexing element;*
   c. *a first pilot ring having at least one precision-finished radially symmetric surface for aligning said coupling flexing element with a first hub;*
   d. *second means for affixing said first pilot ring to a first axial face of said coupling flexing element such that the axis of the precision-finished radially symmetric surface is coincident with the coupling axis, said second means comprising:*
      i. *a plurality of holes passing through said first pilot ring in the direction of its axis and in locations corresponding to the locations of said holes in said coupling flexing element; and*
      ii. *a press fit between said first fastening members and said holes in said first pilot ring;*
   e. *said first hub being integral with or adapted to be connected to a shaft for the transmission of rotary power and having at least one precision-finished radially symmetric surface the axis of which is at least approximately coincident with the coupling axis and which is dimensioned to complement the precision-finished radially symmetric surface on said first pilot ring; and*
   f. *third means for mounting said coupling flexing element on said first hub, wherein said third means comprises:*
      i. *a plurality of holes passing through said first hub in the direction of its axis and in locations corresponding to the locations of holes in said coupling flexing element;*
      ii. *a plurality of second fastening members each of which is sized to fit tightly inside the axial hollow in one of said first fastening members and to pass through said first fastening member and said first hub;*
      iii. *a plurality of third nuts one of which is mounted on or integral with each of said plurality of second fastening members and in abutting relationship with the surface of said first hub on the side thereof opposite to said coupling flexing element; and*
      iv. *a plurality of fourth nuts one of which is mounted on or integral with each of said plurality of second fastening members and in abutting relationship with the one of said first and second nuts furthest removed from said first hub on the side of said nut furthest removed from said first hub.*

9. A coupling [as recited in claim 8 wherein] *for transmitting rotary power, comprising:*
   a. [said first fastening members are axially hollow and] *a plurality of flexible laminar elements;*
   b. *first means for holding said laminar elements in facing relationship, thereby creating a coupling flexing element having a coupling axis and two axial faces, said first means comprising:*
      i. *a plurality of holes passing through said coupling flexing element in the direction of its coupling axis;*
      ii. *a plurality of first fastening members each of which is axially hollow and sized to fit tightly inside one of said plurality of holes in said coupling flexing element and to pass through said coupling flexing element;*
      iii. *a plurality of first nuts one of which is mounted on or integral with each of said plurality of first fastening members and in abutting relationship with a first axial face of said coupling flexing element; and*
      iv. *a plurality of second nuts one of which is mounted on or integral with each of said plurality of first fastening members and in abutting relationship with the second axial face of said coupling flexing element;*
   c. *first and second pilot rings, each of said first and second pilot rings having at least one precision-finished radially symmetric surface for aligning said coupling flexing element with a first and second hub, respectively;*
   d. *second and fourth means for affixing said first and second pilot rings to the first and second axial faces, respectively, of said coupling flexing element such that the axes of the precision-finished radially symmetric surfaces are coincident with the coupling axis, said second and fourth means comprising:*
      i. *a plurality of holes passing through said first and second pilot rings in the direction of their axes and in locations corresponding to the locations of said holes in said coupling flexing element; and* ii. a press fit between said first fastening members and said holes in said first and second pilot rings;

e. said first and second hubs each being integral with or adapted to be connected to a shaft for the transmission of rotary power and having at least one precision-finished radially symmetric surface the axis of which is at least approximately coincident with the coupling axis and which is dimensioned to complement the precision-finished radially symmetric surface on said first and second pilot rings, respectively; and f. [said] third and fifth means for mounting said coupling flexing element on said first and second hubs, respectively, [comprise] comprising:
  i. a plurality of holes passing through at least one of said first and second hubs in the direction of their axes and in locations corresponding to the locations of holes in said coupling flexing element;
  ii. a plurality of second fastening members each of which is sized to fit tightly inside the axial hollow in one of said first fastening members and to pass through said first fastening member and said at least one of said first and second hubs;
  iii. a plurality of third nuts one of which is mounted on or integral with each of said plurality of second fastening members and in abutting relationship with the surface of said at least one of said first and second hubs on the side thereof opposite to said coupling flexing element; and
  iv. a plurality of fourth nuts one of which is mounted on or integral with each of said plurality of second fastening members and in abutting relationship with the one of said first and second nuts furthest removed from said first hub on the side of said nut furthest removed from said first hub.

35. A sub-assembly as recited in claim [31] 52 and further comprising:
  a. a second pilot ring [alignment means] having at least one precision-finished radially symmetric surface for aligning said coupling flexing element with a second hub and
  b. [third] fourth means for affixing said second pilot ring to the second axial face of said coupling flexing element such that the axis of the precision-finished radially symmetric surface is coincident with the coupling axis.

47. A coupling as recited in claim 9 and further comprising a relatively inflexible torque transmission member having a torque transmission axis which is at least approximately coincident with the coupling axis, said second hub being mounted on or integral with said torque transmission member.

48. In a coupling for transmitting rotary power, said coupling comprising:
  a. a plurality of flexible laminar elements;
  b. first means for holding said laminar elements in facing relationship, thereby creating a coupling flexing element having a coupling axis and two axial faces, wherein said first means comprises:
    i. a plurality of holes passing through said coupling flexing element in the direction of its coupling axis;
    ii. a plurality of first fastening members each of which is sized to fit tightly inside one of said plurality of holes in said coupling flexing element and to pass through said coupling flexing element;
    iii. a plurality of first nuts one of which is mounted on or integral with each of said plurality of first fastening members and in abutting relationship with a first axial face of said coupling flexing element; and
    iv. a plurality of second nuts one of which is mounted on or integral with each of said plurality of first fastening members and in abutting relationship with the second axial face of said coupling flexing element;
  c. a first hub integral with or adapted to be connected to a shaft for the transmission of rotary power; and
  d. second means for mounting said coupling flexing element on said first hub, the improvement wherein said first fastening members are axially hollow; and said second means comprises:
    i. a plurality of holes passing through said first hub in the direction of its axis and in locations corresponding to the locations of holes in said coupling flexing element;
    ii. a plurality of second fastening members each of which is sized to fit tightly inside the axial hollow in one of said first fastening members and to pass through said first fastening member and said first hub;
    iii. a plurality of third nuts one of which is mounted on or integral with each of said plurality of second fastening members and in abutting relationship with the surface of said first hub on the side thereof opposite to said coupling flexing element; and
    iv. a plurality of fourth nuts one of which is mounted on or integral with each of said plurality of second fastening members and in abutting relationship with the one of said first and second nuts furthest removed from said first hub on the side of said nut furthest removed from said first hub; and wherein
  e. said first hub has at least one precision-finished radially symmetric surface the axis of which is at least approximately coincident with the coupling axis; and
  f. the coupling further comprises
    i. a first pilot ring having at least one precision-finished radially symmetric surface dimensioned to complement the precision-finished radially symmetric surface on said first hub for aligning said first hub and said coupling flexing element; and
    ii. third means for affixing said first pilot ring to a first axial face of said coupling flexing element such that the axis of the precision-finished radially symmetric surface is coincident with the coupling axis, said third means comprising:
      aa. a plurality of holes passing through said first pilot ring in the direction of its axis and in locations corresponding to the locations of said holes in said coupling flexing element; and
      bb. a press fit between said first fastening members and said holes in said first pilot ring.

49. In a coupling for transmitting rotary power, said coupling comprising:
  a. a plurality of flexible laminar elements;
  b. first means for holding said laminar elements in facing relationship, thereby creating a coupling flexing element having a coupling axis and two axial faces, wherein said first means comprises:
    i. a plurality of holes passing through said coupling flexing element in the direction of its coupling axis;
    ii. a plurality of first fastening members each of which is sized to fit tightly inside one of said plurality of holes in said coupling flexing element and to pass through said coupling flexing element;
    iii. a plurality of first nuts one of which is mounted on or integral with each of said plurality of first fastening members and in abutting relationship with a first axial face of said coupling flexing element; and iv. a plurality of second nuts one of which is mounted on or integral with each of said plurality of first fastening members and in abutting relationship with the second axial face of said coupling flexing element;

c. first and second hubs integral with or adapted to be connected to a shaft for the transmission of rotary power; and d. second and fifth means for mounting said coupling flexing element on said first and second hubs, respectively, the improvement wherein said first fastening members are axially hollow; and said second and fifth means comprise:

i. a plurality of holes passing through at least one of said first and second hubs in the direction of their axes and in locations corresponding to the locations of holes in said coupling flexing element;

ii. a plurality of second fastening members each of which is sized to fit tightly inside the axial hollow in one of said first fastening members and to pass through said first fastening member and said at least one of said first and second hubs;

iii. a plurality of third nuts one of which is mounted on or integral with each of said plurality of second fastening members and in abutting relationship with the surface of said at least one of said first and second hubs on the side thereof opposite to said coupling flexing element; and iv. a plurality of fourth nuts one of which is mounted on or integral with each of said plurality of second fastening members and in abutting relationship with the one of said first and second nuts furthest removed from said first hub on the side of said nut furthest removed from said first hub; and wherein e. said first and second hubs have at least one precision-finished radially symmetric surface the axis of which is at least approximately coincident with the coupling axis and f. the coupling further comprises first and second pilot rings each having at least one precision-finished radially symmetric surface dimensioned to complement the precision-finished radially symmetric surface on said first and second hubs, respectively, for aligning said first and second hubs and said coupling flexing element; and ii. third and fourth means for affixing said first pilot ring to a first axial face of said coupling flexing element and said second pilot ring to a second axial face of said coupling flexing element, respectively, such that the axes of the precision-finished radially symmetric surfaces are coincident with the coupling axis, said third and fourth means comprising:

1. a plurality of holes passing through said first and second pilot rings in the direction of their axes and in locations corresponding to the locations of said holes in said coupling flexing element and 2. a press fit between said first fastening members and said holes in said first and second pilot rings.

50. A coupling as recited in claim 49 and further comprising a relatively inflexible torque transmission member having a torque transmission axis which is at least approximately coincident with the coupling axis, said second hub being mounted on or integral with said torque transmission member.

51. A sub-assembly for a coupling for transmitting rotary power, said sub-assembly comprising:

a. a plurality of flexible laminar elements;

b. first means for holding said laminar elements in facing relationship, thereby creating a coupling flexing element having a coupling axis and two axial faces, said first means including holes through said coupling flexing element in the direction of its axis and a plurality of axially hollow first fastening members which fit in said holes;

c. a first pilot ring alignment means having at least one precision-finished radially symmetric surface for aligning said coupling flexing element with a first hub; and d. second means for affixing said first pilot ring alignment means to a first axial face of said coupling flexing element such that the axis of said precision-finished radially symmetric surface is coincident with said coupling axis, said second means including a plurality of holes defined by said pilot ring alignment means in the direction of its axis and in locations corresponding to the locations of said holes in said coupling flexing element, wherein said axially hollow first fastening members fit in the holes defined by said pilot ring alignment means; and e. third means for affixing said coupling flexing element to said first hub, comprising a plurality of second fastening members, each of which fits inside the axial hollow in one of said first fastening members and passes through said first fastening member and is adapted to fit into a hole in said first hub which corresponds to the location of one of said holes in said coupling flexing element.

52. A sub-assembly as recited in claim 51 wherein said first means further comprises:

a. a plurality of first nuts one of which is mounted on or integral with each of said plurality of first fastening members and in abutting relationship with the first axial face of said coupling flexing element; and b. a plurality of second nuts one of which is mounted on or integral with each of said plurality of first fastening members and in abutting relationship with the second axial face of said coupling flexing element.

53. A coupling for transmitting rotary power, comprising:

a. a coupling flexing element, comprising a plurality of flexible laminar elements held in facing relationship, and defining a coupling axis, two axial faces, and a plurality of holes;

b. a first hub having at least one precision-finished radially symmetric surface, the axis of which is at least approximately coincident with said coupling axis, and defining a plurality of holes, the locations of which correspond to the locations of said holes in said coupling flexing element;

c. a first pilot ring, having at least one precision-finished radially symmetric surface which is dimensioned to complement said precision-finished radially symmetric surface on said first hub for aligning said coupling flexing element with said first hub, and defining a plurality of holes in locations corresponding to the locations of said holes in said coupling flexing element;

d. a plurality of axially hollow first fastening members, each of which fits through one of said holes in said coupling flexing element and in the corresponding hole in said pilot ring so as to hold said flexible laminar elements together in facing relationship and so as to fix said coupling flexing element to said pilot ring; and e. a plurality of second fastening members, each of which fits in the axial hollow of one of said first fastening members and extends through said first fastening member and into the corresponding hole in said first hub, so as to mount said coupling flexing element on said first hub and so as to mate said precision-finished radially symmetric surfaces on said first hub and said first pilot ring.

54. A coupling for transmitting rotary power as recited in claim 53, wherein said axially hollow first fastening members are press fit in said holes in said pilot ring.

55. A coupling for transmitting rotary power as recited in claim 54, and further comprising:

a. a plurality of first nuts, one of which is on each of said axially hollow first fastening members and in abutting relationship with a first axial face of said coupling flexing element; and b. a plurality of second nuts, one of which is on each of said axially hollow first fastening members and in abutting relationship with the second axial face of said coupling flexing element, said first and second nuts exerting force on said first and second axial faces, respectively, so as to pre-stress said coupling flexing element.

56. A coupling for transmitting rotary power as recited in claim 55, wherein said axially hollow first fastening members are sized to fit tightly inside said holes in said coupling flexing element.

* * * * *